July 1, 1930.  M. W. SEYMOUR  1,769,041
COLOR FILTER AND PROCESS OF MANUFACTURING THE SAME
Filed May 11, 1928
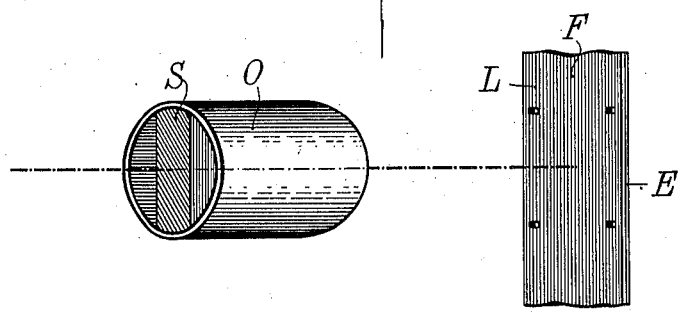
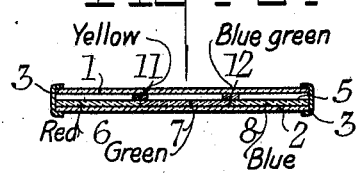
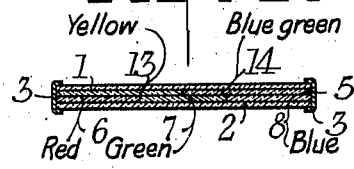
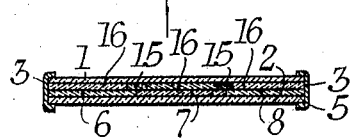
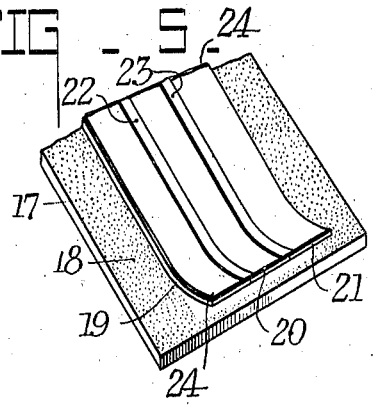
Inventor,
Merril W. Seymour,
By N. M. Perrins
Attorney Patented July 1, 1930

1,769,041

UNITED STATES PATENT OFFICE

MERRILL W. SEYMOUR, OF ROCHESTER, NEW YORK, ASSIGNOR TO EASTMAN KODAK COMPANY, OF ROCHESTER, NEW YORK, A CORPORATION OF NEW YORK

COLOR FILTER AND PROCESS OF MANUFACTURING THE SAME

Application filed May 11, 1928. Serial No. 277,032.

This invention relates to improvements in color photography and more particularly to that system disclosed in the U. S. patent to Berthon No. 992,151, granted May 16, 1911, involving the exposing or projecting of a lenticulated film through an objective having a filter with color areas.

In making filters, it has been customary to fit together pieces of differently colored gelatin film with abutting edges and to cement these between cover glasses with Canada balsam. It is difficult, however, to fit the pieces of filter film so as to make a perfect joint and still more difficult to preserve the contact during the cementing and drying of the filter. Between the colored areas, small interstices are, therefore, apt to be left, through which white light can pass, the effect of which is to degrade the color rendering.

One object of my invention is to join the filter films together so that they cannot become separated in the cementing and drying process. Another object is to cover the joint by a means which leaves no interstices through which white light can penetrate.

These and other objects I accomplish by covering the butt joint between filter bands with a color that is transparent to the rays of the colors lying on the two sides of the joint but highly absorptive of other colors.

Reference will now be made to the accompanying drawings, in the several figures of which the same reference characters denote the same parts and in which Fig. 1 is a diagram of the optical system as a whole;

Figs. 2, 3 and 4 are sections of different embodiments of my improved filter;

Fig. 5 illustrates a method of making the improved filter.

The color system in which this invention is an improvement is that in which an exposure is made, through an objective in mount O having on the front or otherwise associated therewith a color filter or screen S with preferably three color bands, upon a film F, the front surface of which is lenticulated at L and the rear surface of which has a panchromatic sensitive emulsion E. Such a system is shown diagrammatically in Fig. 1, but the system as a whole is well known and it is to be understood that the position of the color filter and other characteristics of the system may be varied in manners shown in the existing literature and patents. The invention relates specifically to an improvement in the filter and a method of making it.

In the several forms of my invention, the filter preferably has cover plates of glass 1 and 2 between which is a color absorbent filter layer designated 5 as a whole, and the edges of the filter may be bound with a waterproof seal 3. The thickness of the filter layer is shown on an exaggerated scale.

The colored medium used for the filter bands is preferably a thin layer of gelatin containing a dye having the desired properties. As my invention is of general application and this type of color filter medium is well known, a further description is not necessary.

In Fig. 2, the main filter bands 6, 7 and 8, which may be respectively red, green and blue, lie in one plane with abutting edges, and narrow strips 11 and 12 which are yellow and blue green respectively overlie the joints.

In Fig. 3, the bands 6, 7 and 8 are the same as in Fig. 2, and two bands 13 and 14 lie upon them. Band 13 is yellow and overlies the red band and half the green band, and band 14 is blue-green and overlies the blue band and the other half of the green band.

The form shown in Fig. 4 is the same as Fig. 2, except that the strips 15 overlying the joints are of uncolored gelatin. By the process of manufacture, as hereinafter described, any inequalities in the surface are overcome by a layer 16 of Canada balsam or lacquer.

In describing each of the above forms, the words red, green, blue, yellow and blue-green, as used to describe the filter areas, have the following significance: red denotes transmission of substantially all of the red region of the spectrum and absorption of almost all of the other colors; green denotes transmission of the green almost exclusively; blue denotes transmission of only the blue and violet; blue-green denotes transmission of the green, blue and violet and absorption of only the red, while yellow denotes transmission of both the red and green regions and absorption of only the blue and violet.

It is to be noted, therefore, that the strip overlying the junction of two adjacent filter bands is transparent to the colors transmitted by the two bands and does not affect the color transmitted by these bands, so that there is no visible band or region of different color between the main bands. It is further to be noted that in each of the forms described, at least the junction portion is made of superposed layers having different light transmitting properties as regards color and that one of these layers overlaps the boundary between adjacent color areas.

I will now describe certain methods of manufacture to which these filters are adapted and in which they have well-defined advantages.

One way in which these filters may be made is illustrated in Fig. 5. Upon a glass plate 17, coated with tacky rubber 18, three color filter strips, 19, 20, and 21, are laid down side by side, and narrow strips 22 and 23 are laid down over their junction lines. A layer 24 of transparent lacquer of any well known type, such as a fast drying cellulosic lacquer, is then applied. The whole is then stripped and utilized in making a filter of the type shown in Figs. 2 and 4, though this method is obviously applicable to the making of other types. The layer will tend to flow from the top of the narrow strips 22 and 23 and to render the filter layer as a whole substantially flat on its upper surface.

A very convenient way of applying the lines 22 and 23 is in the form of a warm gelatin solution that may be applied by a ruling pen. The gelatin will be dyed if the filter of Fig. 2 is to be made, or clear if the form of Fig. 4 is to be made. This gelatin line of itself gives sufficient strength to the joint to permit of the assembled filter layer being removed and handled with care in the formation of the finished filter. The assembled sheet, with or without the layer 24, is cut to size and mounted between optical flats, Canada balsam being used to cement the elements in place.

It is obvious that these strips 22 and 23 are exceedingly thin.

If clear undyed gelatin is used for the lines 22 and 23, particular care must be taken to cut the edges of the filter bands perfectly true and to fit them together tightly without pinholes or interstices.

In all of the forms described it is to be noted that there is a layer overlapping the joint, the layer being transparent to the colors transmitted by both bands, and that this overlapping layer is applied to the joints in manufacturing the filter sheet as a whole and serves to cement the adjacent bands together and to hold them in proper, tight relation during the operation of assembling the completed filter as an article of manufacture.

It is obvious that other embodiments are possible and I contemplate as included within my invention all such modifications and equivalents as fall within the scope of the appended claims.

Having thus described my invention, what I claim as new and desire to secure by Letters Patent is:

1. A color filter comprising a plurality of abutting filter sheets, the several sheets transmitting light respectively in different portions of the spectrum, and supplemental strips overlapping the joints between adjacent filter sheets, each of said strips being transparent to light of the colors transmitted by both the sheets which it overlaps.

2. A color filter comprising a plurality of abutting filter sheets, the several sheets transmitting light predominantly in different portions of the spectrum, and supplemental strips overlapping the joints between adjacent filter sheets, each of said strips being transparent to light of the colors transmitted by both the sheets which it overlaps and absorptive of other colors.

3. A color filter comprising a plurality of abutting filter sheets, the several sheets transmitting light respectively in different portions of the spectrum, and supplemental strips overlapping the joints between adjacent filter sheets, each of said strips being transparent to light of the colors transmitted by both the sheets which it overlaps, said strips being narrow in comparison with said sheets.

4. A color filter comprising a plurality of abutting filter sheets, the several sheets transmitting light predominantly in different portions of the spectrum, and supplemental strips overlapping the joints between adjacent filter sheets, each of said strips being transparent to light of the colors transmitted by both the sheets which it overlaps and absorptive of other colors, said strips being narrow in comparison with said sheets.

5. A color filter comprising three abutting filter sheets transmitting light respectively in the red, green and blue-violet portions of the spectrum, and absorbing light in other portions respectively, and supplemental strips overlying the joints, between adjacent filter strips and transparent to light of the colors transmitted by both sheets which it overlies.

6. A color filter comprising three abutting filter sheets transmitting light respectively in the red, green and blue-violet portions of the spectrum, and absorbing light in other portions respectively, and supplemental strips overlying the joints, between adjacent filter strips and transparent to light of the colors transmitted by both sheets which it overlies and absorptive of other color.

7. A color filter comprising three abutting filter sheets, the several sheets transmitting light predominantly in the red, green and blue-violet portions of the spectrum respectively, and supplemental strips overlying the joints between said sheets, the strip overlying the joint between the red and green sheets transmitting red and green, and the strip overlying the joint between the green and blue-violet sheets transmitting those colors.

8. A color filter comprising three abutting filter sheets, the several sheets transmitting light predominantly in the red, green and blue-violet portions of the spectrum respectively and absorbing light in other portions respectively, and supplemental strips overlying the joints between said sheets, the strip overlying the joint between the red and green sheets transmitting red and green and absorbing blue-violet and the strip overlying the joint between the green and blue-violet sheets transmitting those colors and absorbing red.

9. A color filter for use in a photographic color process involving the use of a photographic layer having minute image-forming elements associated therewith, said filter comprising three abutting filter sheets in a common plane, the several sheets transmitting light respectively in the red, green and blue-violet portions of the spectrum and absorbing light in the other regions respectively, and supplemental strips narrow in comparison with the filter sheets overlying the joints between said sheets, the strip overlying the joint between the red and green strip transmitting red and green and absorbing blue-violet and the strip overlying the joint between the green and blue-violet sheets transmitting those colors and absorbing red.

10. The method of making color filters that comprises laying in abutting contact, side by side, sheets of material having the property of transmitting light in different portions of the spectrum, applying over the joints between adjacent sheets strips of material adhesive to said sheets, whereby the sheets are united to form a tenuous layer.

11. The method of making color filters that comprises laying in accurate abutting contact, side by side, sheets of material having the property of transmitting light in different portions of the spectrum, apply-ing over the joints between adjacent sheets strips of material adhesive to said sheets, whereby the sheets are united to form a tenuous layer, and mounting a portion of said layer including part of each sheet between protective sheets of transparent material.

12. The method of making color filters that comprises applying to a smooth support a layer of tacky material, placing thereon in accurate, abutting contact, side by side, sheets of material having different light transmitting properties, applying over the joints between adjacent sheets strips of material adhesive to said sheets whereby the sheets are united to form a tenuous layer, and stripping such layer from the support.

13. The method of making color filters that comprises applying to a smooth support a layer of tacky material, placing thereon in accurate, abutting contact, side by side, sheets of material having different light transmitting properties, applying over the joints between adjacent sheets, strips of material adhesive to said sheets whereby the sheets are united to form a tenuous layer, applying a varnish coating to said layer and stripping the layer from the support.

Signed at Rochester, New York, this 4th day of May, 1928.

MERRILL W. SEYMOUR.